May 15, 1945.  L. L. BOSCH  2,376,307
ELECTRICAL BUS BAR
Filed June 27, 1941
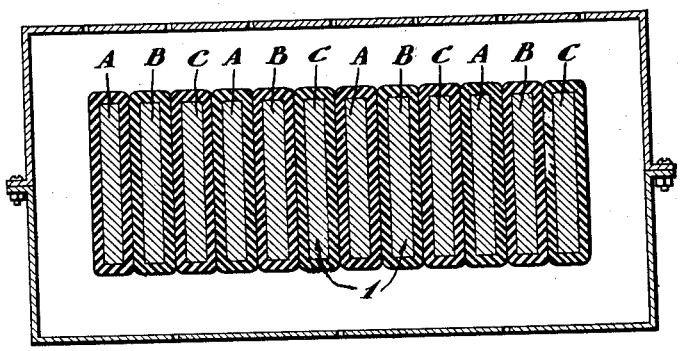
INVENTOR.
Lester L. Bosch
BY
Wood, Ary, Herron & Evans
ATTORNEYS Patented May 15, 1945

2,376,307

UNITED STATES PATENT OFFICE 2,376,307

ELECTRICAL BUS BAR

Lester L. Bosch, Cincinnati, Ohio, assignor to R. E. Kramig & Company, Inc., Cincinnati, Ohio, a corporation of Ohio Application June 27, 1941, Serial No. 400,065

12 Claims. (Cl. 174—113)

This invention relates to electrical bus-way distribution systems. It is directed particularly to an organization of bus bars which are spaced very closely adjacent one another, yet appropriately electrically insulated and thermally cooled. While the fundamental arrangement of the bus bars contemplated by the present invention is, in some respects, generally the same as that employed in the prior art, still the differences in structure make for almost profound improvements in the capacities of the systems, the voltage regulation of them, and their electrical efficiency.

It has been understood by those skilled in the art that closer spacing of bus bars would, if feasible, work an improvement in their electrical performance, and this invention is based primarily upon improvements which make that desirable result now possible and practical. Since the manner in which these benefits are wrought is in some respects complex, a brief explanation of the problems and the electrical considerations which are involved is helpful in understanding the nature of the present advance.

A bus bar is an electrical conductor used to carry heavy electrical currents; for example, currents greater than say 250 amperes. Bus bars are copper strips, usually rectangular, varying in size from say about one-eighth of an inch by two inches, up to one-quarter by six inches or more; they are either solid or hollow-shaped. Bars like this, some eight or ten feet in length or more, are connected one to another, in a run, from the point of electrical supply to the point of electrical delivery; for example, from a transformer station to an outlet, or a plurality of them.

If a direct current is passed through a bus bar, it distributes itself substantially uniformly throughout the bar cross section; that is, each unit of cross-sectional area carries an amount of current which is equal to that carried by each other unit of cross-sectional area.

The flow of current through the bar sets up a magnetic field around the bar. If another bar is placed at a spaced distance from the first, the magnetic field, that is, the magnetic lines of force, "cut" the second bar to cause a voltage to be induced in it. This voltage exists for a momentary period only and is not continuous since direct current is a uni-directional current and electricity is generated only at the instant that the lines of force actually "cut" the bar. If there is an independent current flowing in the second bar the magnitude of its current is influenced by the voltage induced in it by the first bar. Likewise, a current surge in the second bar influences the current flowing momentarily in the first.

An alternating current is different from a direct current in that it is at one moment positive, and at the next moment negative and the periodicity of alternations is governed by the frequency. When an alternating current flows through an electrical conductor, the magnetic field which it sets up is expanding at one moment, due to its positivity, and collapsing at the next, due to its negativity. Between positive and negative peaks the field is zero. In effect, therefore, the field around a conductor carrying alternating current is in the nature of a pulsating magnetic field. Each time this field "cuts" or passes through an adjacent conductor, electrical energy is set up in that conductor. This effect is called a mutual inductance and the induced voltage either aids or retards the current flow, depending upon the relative direction of flow in the conductors.

But each time the field expands and collapses, it, in turn, "cuts" or passes through the conductor from which it originated and there is, in turn, a voltage set up in the originating conductor due to this magnetic influence which it has upon itself. This voltage, however, is out of step with the originating voltage and, therefore, opposes it. Due to the higher magnetic field in the center of the conductor the induced voltage acts in such a direction as to oppose current flow to a greater extent in the central portion of the conductor than at the portions adjacent the outside surfaces, giving rise to what is called the "skin" effect. The net result is distortion of the path of the current within the conductor.

While the influence of one conductor upon an adjacent conductor has been considered, the fact is that one conductor will affect all others in its proximity, though to different extents, depending upon the spacing and current relationships, causing a further distortion of the distribution of the current in the bus bar. The current distribution is, therefore, affected by both skin and proximity effects.

Bus bars are used most frequently in three-phase distribution systems—three bars for each circuit, and it will be seen that each bar exerts mutual inductance upon the others and self-inductance upon itself. And, while the extent of mutual inductance and self-inductance can readily be calculated mathematically by rules well recognized, the problem becomes particularly tedious when three-bar sets are run in banks; that is, for example, three or four sets of three bars each all arranged in spaced parallel relationship in the manner which has been quite conventional in the past.

In alternating current circuits mutual inductance and self-inductance set up reactance, an effect which is akin to resistance in that both impede or obstruct the flow of current. The magnitude of the reactance is important, as a practical matter, because any electrical obstruction or impedance to the flow of current causes a loss of power, a drop in the voltage, the generation of heat, and, usually, a decrease in the so-called power factor. The latter value, generally stated, is the ratio between the true power to the volt amperes in the bus bar circuit.

It has been appreciated in the past that the total reactance of a circuit is influenced by the spacing of the bus bars and that the total reactance can be reduced if the bars be arranged very closely adjacent one to another. It has also been appreciated that if rectangular bus bars spaced flatwise could be brought closer together the proximity effect would tend to neutralize the skin effect and therefore generally improve the current distribution in the bars. However, the practical problem of insulation is involved. It is necessary to prevent short circuiting of the direct flow of current from one bar to another. While air is a good insulator, the small air gap required to obtain satisfactory performance insofar as reactance is concerned is not great enough to provide acceptable mechanical clearances.

Under conditions of high transient current flow bus bars are subjected to tremendous mechanical forces—forces so great as actually to cause the bars to deflect, if the bars are close together, and come into direct contact with each other causing short circuiting. Such short circuiting can be prevented by the wrapping around the bars of insulating materials of the type which heretofore have been available, but this practice has not been satisfactory because it gives rise to a third problem—that of heat and the dissipation of it.

Electrical energy flowing through a bus bar causes the bar to become hot and insurance underwriters have specified that no bus bar distribution system shall carry a current greater than that which causes a given temperature rise in any of its conductors; the underwriters limit at present is 50° C. This limitation has been placed on temperature rise to guard against fire hazards incidental to the heating.

The capacity of a given distribution system therefore is governed by the "hottest" member of the system in much the same manner that the capacity of a chain is limited by its weakest link. This is an important consideration because with conventional insulatnig materials the only present way the capacity of such a system can be increased is by using conductors of a larger size—a costly expedient.

Moreover, the temperature rise in a conventional bus bar system is not uniform because, due to the effects of mutual inductance, some of the conductors become hotter than others. For example those in the center of a bank usually have a lower reactance than those at the outside and consequently carry greater current. However, the greater current passing through them causes them to become hotter than those on the outside but the center bars have less opportunity of dissipating heat than the outside bars. If conventional electrical insulating materials be used to surround the members in order to permit them to be spaced closely adjacent one another, the heat is confined and the temperature rise is aggravated. Therefore, its use may improve reactance but the bars operate at a higher temperature and their permissible capacity is decreased.

These then are the considerations which have led to the continued widespread spacing of bus bars in industrial distribution systems. The disadvantages have been recognized but no satisfactory means has been available to overcome them.

The present invention is based upon the discovery of a product which is both a good electrical insulating material and a good conductor of heat. This material is comprised, paradoxically, of asbestos and yet tests have indicated that if the fibers of which this material is comprised be compacted it has the capacity to dissipate as much as, and in some cases actually more heat from a conductor which it surrounds than the amount of heat dissipated into the air under equal conditions by the bare conductor itself.

The asbestos product of the present invention is a dense, hard material and it is constructed in the form of a sheath within which a bus bar may be inserted telescopically. The wall thickness of the sheath is sufficiently thin to enable bars similarly sheathed to be placed directly alongside one another and yet be spaced apart a distance less than has heretofore been either practical or possible. These sheaths extend the entire length of the bars and the joints between bars in a given run may be made in the usual manner, or they may be staggered so that the sheathing of one bar is capable of providing sufficient electrical insulation to provide protection against short circuiting through exposure of the metallic connectors.

The preferred product of the present invention is a laminated structure made from asbestos paper, felt, or asbestos containing sheet material which is wrapped about a mandrel of the size and shape of the bus bar which is eventually to be accommodated, there being sufficient laminations to produce walls of the desired thickness. A bus bar itself may be the mandrel. The thickness of the walls may vary from about one-sixteenth of an inch to a quarter of an inch, more or less, depending upon the electrical conditions and mechanical requirements.

In the manufacture of such sheaths, as the asbestos paper or sheet material comprised of asbestos fibers is wound about a mandrel the layers are cemented together as the winding progresses. Silicate cement or synthetic resin cement is employed to furnish the bond between laminations, and the sheaths are then dried or baked to set the adhesive. The sheaths so made are hard and strong, due to the felted or fibrous structure of the laminations of which they are comprised, very dense, due to the laminated structure, very good electrical insulators, due to the asbestos they contain, yet poor heat insulators; i. e. good heat emitters.

Figure 1 of the drawing shows a typical product of the present invention encasing a typical bus bar. The bus bar is indicated generally at 1 and is of the usual rectangular type.

Figure 2 indicates generally the sheathing which, as shown, is comprised of the laminations 3, appropriately cemented one to another.

Figure 3 shows 3 bus bars, similarly sheathed, arranged in side by side relationship.

The system illustrated in Figure 4 is comprised of four sets of three-phase bus bars, the corresponding phases being designated A, B and C. Such assemblies may be arranged in bank, one over the other if desirable.

Figure 5 is a view similar to Figure 4 and shows a modified form of structure in which spacers 5 are provided between the sheathed bus bars.

It is preferable that the surface of the sheet material containing the asbestos fibers be rough to obtain the best heat emission. Ordinary asbestos paper is very suitable in preparing the sheaths for this reason, although it will be understood that dense sheaths also may be made by extrusion if desirable. In instances where many sheathed bars are placed in side by side relationship, it has been found that the sheaths may be fluted, corrugated, slotted or spaced apart slightly to provide for flow of air to carry away the heat dissipated by the sheathing. Slots may be formed in the side walls of the sheaths so as to provide for air passageways and these may extend part way through the sheathing or all the way through, though in the latter instance, it becomes necessary to take special precautions to avoid loss of energy through skin creepage.

To avoid the pocketing of air between the sheathing and the conductor the sheath should fit the conductor snugly. Air is a good heat insulator and, when trapped intermediate the bar and the sheath, may prevent the sheathing from acting to its full capacity to dissipate the heat of the bar.

It is desirable in some instances, though not necessary, to apply upon or impregnate the sheaths with a varnish for the purpose of preventing the asbestos fibers of the sheaths which are of a hygroscopic nature when untreated, from absorbing moisture to such an extent that their insulating properties are disturbed. Bakelite varnishes are suitable for this purpose and are disclosed as an illustration, though so-called insulating dopes or varnishes or oils or other types may be employed. When the sheaths are impregnated with the insulating varnish, further protection is provided against absorption of moisture at ends exposed when the sheaths are cut to length.

A typical sheath of the present invention constructed of laminations of asbestos paper, which laminations are cemented together with conventional silicate cement which subsequently is set by drying, has an average dielectric strength of approximately one hundred volts per mill of thickness. This dielectric strength is more than adequate to permit bus bars encased in thin wall sheaths of the material to be placed directly adjacent one another in closely spaced relationship without encountering any difficulties of short circuiting.

The high emissivity of the sheathing accounts, at least in part, for its unusual heat dissipating characteristics. As an illustration, a bar encased within the sheathing of the present invention and having a temperature of 395° F. actually lost heat more rapidly under ordinary still air conditions than a similar bare bus bar at the same temperature. These figures are not disclosed by way of limitation but illustrate the unusual cooling effect which the sheathing exerts upon the bar that it encases.

Bus bars housed within the present enclosures may be mounted in the conventional manner in sheet metal bus ways though the compactness of organization of them enables the sheet material bus ways to be of substantially reduced size. Also iron may be used as a housing material even on high capacity systems because by virtue of the insulating material permitting the bars to be spaced very close together the magnetic field surrounding the bar assembly is confined to such a small diameter that expensive aluminum or other non-magnetic materials are not required.

After the sheathed bars have been set up side by side in the bus ways it is preferable to clamp them together into bundles so that they readily may be supported. The clamping of the bus bars also tends to minimize any damage which may be caused by explosive disruption of the assembly in the event of short circuiting of the system. While disruptions of this sort are not usual, severe damage has been caused on certain occasions in the past since the violence of electrical forces tending to throw the bars apart upon short circuiting has much the effect of an explosion.

At turns and bends flexible sheaths of appropriate insulating qualities may be used. In the alternative, plates of the dense electrical insulating material of the present invention can be inserted between the bars at the bends and turns.

A typical arrangement of this type is shown in cross section in Figure 5 in which the spacer elements 5 are utilized between the sheathed bars.

In the preferred form, as previously disclosed, the product of the invention is a tubular structure adapted to be slid telescopically over the bus bar which it is to encase. This feature simplifies to a great extent the assembly of bus bar systems either in the manufacturing plant or at the point of installation. However, while the product of the invention in the preferred form has been disclosed as a tube of sheet material consisting primarily of asbestos fibers wound upon itself, it is also contemplated that bus bars may be equipped with insulating sheaths by dipping them once or several times in a slurry consisting essentially of asbestos fibers or by depositing fibers on individual bus bars to build up a sheathing coat of appropriate thickness.

The sheaths may be cut very readily with a knife or saw to any length required. Still more important also, costly porcelain shields and the like are not required to maintain the bars in predetermined widely spaced relationship. Instead the bars can be assembled in bundle form and then inserted in the usual bus bar troughs.

It is to be understood that the dimensions and data given in the foregoing specification are illustrative and not by way of limitation; it is desired that the invention may be limited only by the scope of the claims which follow.

Having described my invention, I claim:

1. A combination of an electrical bus bar and a sheath extending continuously around the bus bar over substantially its entire length in snug fitting relationship therewith, the said sheath being a hard, dense material comprised primarily of compact asbestos fibers, whereby said sheath is a good heat conductor capable of dissipating from the bus bar heat generated by the passage of electricity through the bus bar, said sheath being of such thickness that two bus bars having such sheaths may be placed in side by side relationship without short circuiting of electrical energy carried by bus bars housed within such sheaths.

2. A sheath for a bus bar comprising an elongated tube having a tube opening of such dimensions that it may snugly fit around a bus bar of predetermined dimensions, but said sheath being made of a hard, dense material consisting primarily of compact and bound asbestos fibers, whereby the said sheath is substantially non-hygroscopic and has good electrical insulating properties, with the thickness of the walls of the sheath being of the order of approximately one-eighth to one-quarter of an inch.

3. A sheath for an electrical bus bar comprising a tube having a tubular opening of such dimensions that an electrical bus bar of predetermined dimensions may be fitted snugly therein, the said sheath being constructed primarily of asbestos fibers, the said fibers being arranged in dense, compact and bound relationship, whereby the sheath is substantially non-hygroscopic and has good electrical insulating properties, while the compactness of the fibers of asbestos endows the sheath with good heat conducting properties.

4. A sheath for a bus bar comprised of an elongated tube constructed of laminations of asbestos paper, the said laminations being cemented with one another, the internal dimensions of the tube being such that the sheath will fit snugly around a bus bar of predetermined dimensions, the fibers of the asbestos paper being in compact relationship so that the sheath is densse and is a good heat conductor.

5. The combination of an electrical bus bar and a sheath which fits around the bus bar snugly, the sheath being constructed primarily of asbestos fibers arranged in dense compact relationship, the said fibers being bound together with a cement which is a non-conductor of electricity, whereby said sheath is a good electrical insulator while the compact asbestos fibers of the sheath constitutes a good heat conductor, the walls of the sheath being of the order of about one-eighth to about one-quarter of an inch in thickness, whereby a plurality of bus bars similarly sheathed may be arranged in side by side relationship for minimization of mutual and self inductance electrical effects and yet protected by the sheaths against short circuiting and creepage losses.

6. A bus bar unit, comprising an electrically conductive bus bar of substantially flat rectangular shape and electrical insulating sheathing associated with the bus bar over substantially its entire unitary length, said sheathing comprising a tube formed of material consisting essentially of asbestos fibers in a compact, dense, relatively hard relationship, said fibers being bound together whereby said tube is substantially non-hygroscopic and has good electrical insulating properties, the tubular aperture within the sheathing being of such dimensions that the electrically conductive bus bar fits snugly within it.

7. A bus bar conductor insulator assembly, comprising a bus bar of substantially rectangular shape and an electrical insulating sheath surrounding said bus bar over substantially its entire length in snug fitting relationship, the said sheath being comprised of laminations of material consisting essentially of asbestos, the said laminations being cemented together and compactly arranged, and the said sheath being relatively hard and dense.

8. A bus bar conductor assembly, comprising spacing members, a plurality of tubular electrical insulation sheathing members supported against one another by said spacing members, and bus bar members residing in the tubular apertures in said sheathing members, the sheathing and spacing members each being comprised of cemented laminations of asbestos sheet material wound into tube form with the asbestos fibers residing in dense, compact relationship whereby they are good electrical insulators and also good heat conductors and heat dissipators.

9. A bus bar conductor assembly comprising a plurality of tubular electrical insulating sheathing members arranged in closely spaced, substantially side by side relationship and bus bars residing in the tubular apertures in said sheathing members, each sheathing member being comprised primarily of asbestos fibers which reside in dense, compact relationship, whereby said sheaths are good electrical insulators and also good heat conductors and heat dissipators, the wall thicknesses of the sheathing members being sufficiently thick to prevent short circuiting of electrical energy carried by the bur bars housed within the sheaths while the spacing between bus bars housed within said sheaths is sufficiently close to minimize the "skin" and "proximity" effects caused by alternating current flowing in bus bars housed within the sheaths.

10. A bus bar conductor assembly comprising a plurality of electrical bus bars arranged in spaced, substantially parallel relationship on centers not exceeding substantially one-half to three-quarters of an inch, and tubular electrical insulating sheaths surrounding the bus bars respectively in snug-fitting relationship thereto, each sheath being comprised primarily of asbestos fibers which reside in a dense, compact and bound relationship, whereby said sheaths are good electrical insulators, are substantially non-hygroscopic and are also good heat conductors and heat dissipators, the walls of said sheaths being sufficiently thick to prevent short circuiting of electrical energy carried by the bus bars housed within said sheaths, while the close center-to-center spacing of the bars minimizes "skin" and "proximity" effects caused when alternating current flows through saiu bus bars.

11. In a polyphase bus bar system of distribution, a number of flat bus bars connected to a source of alternating current and each enclosed in an insulating sheath formed of highly compressed felted asbestos fibre capable of withstanding heat and of dissipating heat and positioned side by side in close proximity to each other.

12. In a power distribution system, a flat bus bar encased in a continuous sheath of highly compressed felted asbestos fibre capable of withstanding heat and capable of dissipating heat.

LESTER L. BOSCH.